United States Patent
Shiratori et al.

(10) Patent No.: US 12,539,540 B2
(45) Date of Patent: Feb. 3, 2026

(54) CEMENTED CARBIDE COMPOSITE MATERIAL, METHOD FOR PRODUCING SAME, AND CEMENTED CARBIDE TOOL

(71) Applicant: Proterial, Ltd., Tokyo (JP)

(72) Inventors: Hiroshi Shiratori, Tokyo (JP); Hirotsugu Kawanaka, Tokyo (JP); Shuho Koseki, Tokyo (JP); Tadashi Furuya, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 290 days.

(21) Appl. No.: 16/651,614

(22) PCT Filed: Sep. 20, 2018

(86) PCT No.: PCT/JP2018/034850
§ 371 (c)(1),
(2) Date: Mar. 27, 2020

(87) PCT Pub. No.: WO2019/069701
PCT Pub. Date: Apr. 11, 2019

(65) Prior Publication Data
US 2020/0299814 A1 Sep. 24, 2020

(30) Foreign Application Priority Data

Oct. 2, 2017 (JP) .................... 2017-192951

(51) Int. Cl.
*B22F 7/08* (2006.01)
*B22F 10/25* (2021.01)
(Continued)

(52) U.S. Cl.
CPC ............... *B22F 7/08* (2013.01); *B22F 10/25* (2021.01); *B22F 10/362* (2021.01); *B22F 10/64* (2021.01);
(Continued)

(58) Field of Classification Search
CPC ....... B22F 2005/001; B22F 2003/1057; B32B 15/04; C22C 29/08; C22F 1/10; B23K 15/086; B28B 1/001
See application file for complete search history.

(56) References Cited

U.S. PATENT DOCUMENTS 6,035,844 A * 3/2000 Otani .................. B23D 61/04
83/835
6,830,643 B1 * 12/2004 Hayes ................... B33Y 10/00
156/289

(Continued)

FOREIGN PATENT DOCUMENTS

CN 106583726 * 4/2017
JP H11-221680 A 8/1999
(Continued)

OTHER PUBLICATIONS

Korner, C. "Additive manufacturing of metallic components by selective electron beam melting." 2016. International Material Reviews. 61. 5. p. 361-377. (Year: 2016).*

(Continued)

*Primary Examiner* — Nicholas A Wang
(74) *Attorney, Agent, or Firm* — Volpe Koenig

(57) ABSTRACT

Provided is a cemented carbide composite material including cemented carbide and non-cemented carbide having better high-temperature strength than conventional materials and capable of suppressing breakage and peeling of the composite material. A cemented carbide composite material includes: a cemented carbide part including WC—Co-based cemented carbide; a substrate part including metal that contains at least one of Ni and Co that accounts for 50 mass % or more in total. This cemented carbide composite material has an intermediate layer between the cemented carbide composite material and the substrate part, the intermediate layer containing components of the cemented carbide part (Continued)

and components of the substrate part. The intermediate layer includes a part having a gamma phase fraction of 80% or more and having Vickers hardness less than 700 HV.

5 Claims, 17 Drawing Sheets

(51) Int. Cl.
*B22F 10/362* (2021.01)
*B22F 10/64* (2021.01)
*B32B 15/04* (2006.01)
*B33Y 10/00* (2015.01)
*B33Y 80/00* (2015.01)
*C22C 29/08* (2006.01)
*C22F 1/10* (2006.01)

(52) U.S. Cl.
CPC .............. *B32B 15/04* (2013.01); *B33Y 10/00* (2014.12); *B33Y 80/00* (2014.12); *C22C 29/08* (2013.01); *C22F 1/10* (2013.01)

(56) References Cited

U.S. PATENT DOCUMENTS

| | | |
|---|---|---|
| 2009/0293672 A1 | 12/2009 | Mirchandani et al. |
| 2010/0101368 A1* | 4/2010 | Fang ........................ C22C 29/08 75/240 |
| 2016/0144468 A1 | 5/2016 | Nam |
| 2016/0279734 A1 | 9/2016 | Schick et al. |
| 2016/0375493 A1* | 12/2016 | Stoyanov ............... B33Y 10/00 419/6 |

FOREIGN PATENT DOCUMENTS

| | | |
|---|---|---|
| JP | 2004-211162 A | 7/2004 |
| JP | 2006-175456 A | 7/2006 |
| JP | 2008-169419 A | 7/2008 |
| JP | 2008169419 * | 7/2008 |
| JP | 2011-523681 A | 8/2011 |
| JP | 2013-107187 A | 6/2013 |
| JP | 2016-108668 A | 6/2016 |
| JP | 2016108668 * | 6/2016 |
| JP | 2016-196702 A | 11/2016 |
| JP | 2017-501890 A | 1/2017 |
| WO | 2012/128708 A1 | 9/2012 |

OTHER PUBLICATIONS

Special Metals. "Inconel alloy 718". 2007. (Year: 2007).*
Property Comparison Tables: Hardness and Tensile Properties, Mechanical Testing and Evaluation, vol. 8, ASM Handbook, Edited By Howard Kuhn, Dana Medlin, ASM International, 2000, p. 935-938, https://doi.org/10.31399/asm.hb.v08.a0003331 (Year: 2000).*
M. Koopman, Z.Z. Fang, X. Wang, Pankaj K. Mehrotra, Properties and Selection of Cemented Carbides, Powder Metallurgy, vol. 7, ASM Handbook, Edited By P. Samal, J. Newkirk, ASM International, 2015, p. 705-710, https://doi.org/10.31399/asm.hb.v07.a0006064 (Year: 2015).*
International Search Report for PCT/JP2018/034850 A1, Nov. 6, 2018.

* cited by examiner

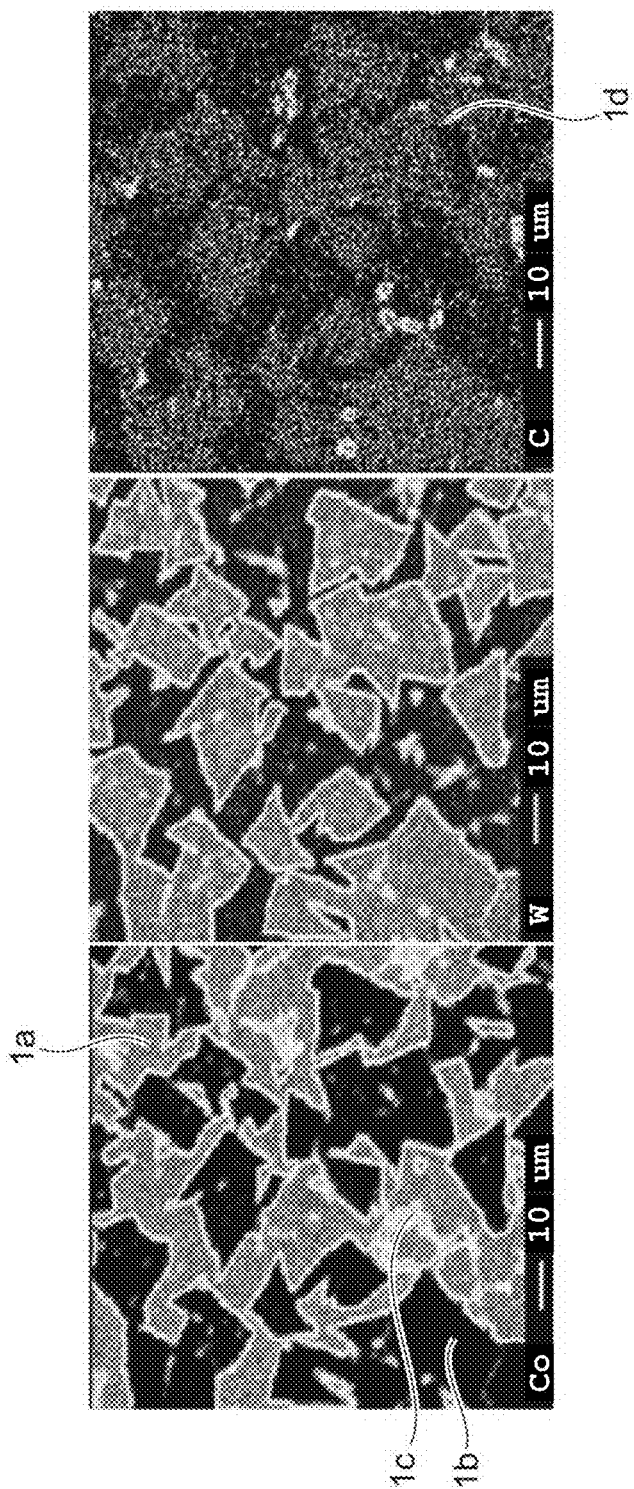

CEMENTED CARBIDE COMPOSITE MATERIAL, METHOD FOR PRODUCING SAME, AND CEMENTED CARBIDE TOOL

TECHNICAL FIELD

The present invention relates to cemented carbide composite materials including cemented carbide and non-cemented carbide, methods for producing the same, and cemented carbide tools.

BACKGROUND ART

Conventionally inventions about a method for producing a cutting tool made of cemented carbide only at the cutting part and a cutting tool produced by such a method have been known (see Patent Literature 1). Patent Literature 1 discloses the method of bonding of a body made of tool steel for hot working and a cutting part made of cemented carbide by heat treatment, and coating the surface of the cutting tool with a film made of at least one of metal oxide, nitride, and carbide (see claim 1, for example, in Patent Literature 1).

Inventions about a bonded material made of cemented carbide and steel, and a method for producing the bonded material also have been known. This bonded material is effective for a die, such as a forging punch, an extrusion die, or an extrusion punch, which are required having abrasion resistance, and is at low cost and is a long-life material. (see Patent Literature 2). Patent Literature 2 discloses a bonded material of cemented carbide and steel that are bonded with Ni as an insert material. The thickness of the Ni insert is 0.1 mm or more and 0.5 mm or less, the lattice constant of the Ni insert material is 3.540 angstroms or more and 3.580 angstroms or less, and the Co content of the cemented carbide is 40 weight % or less (see claim 1, for example, in Patent Literature 2).

Patent Literature 2 discloses the method for producing the bonded material as well. The method inserts steel, a Ni insert material, and cemented carbide or a cemented carbide with different Co content in the descending order of the Co content in a graphite die, and applying predetermined pressure with a graphite punch while applying current directly to the graphite punch or the die for electric-current pressured sintering (see claim 4, for example, in Patent Literature 2).

CITATION LIST

Patent Literature

Patent Literature 1: JP 2017-501890 A
Patent Literature 2: JP H11-221680 A

SUMMARY OF INVENTION

Technical Problem

According to Patent Literature 1, the coating film improves the mechanical property of the cutting tool by about 1.5 times as compared with the tool before the coating (see paragraph 0030, for example, in Patent Literature 1). The coating may cause insufficient high-temperature strength of the cutting tool. Electric-current pressure sintering as in Patent Literature 2 may cause breakage or peeling at the bonded material because of a change in dimensions of the cemented carbide.

The present invention provides a cemented carbide composite material including cemented carbide and non-cemented carbide having high-temperature strength and capable of suppressing breakage and peeling of the composite material.

Solution to Problem

A cemented carbide composite material of the present invention includes: a cemented carbide part including WC—Co-based cemented carbide; a substrate part including metal that contains Ni or Co that accounts for 50 mass % or more in total; and an intermediate layer between the cemented carbide part and the substrate part, the intermediate layer containing components of the cemented carbide part and components of the substrate part, the intermediate layer including a part having a gamma phase fraction of 80% or more and having Vickers hardness less than 700 HV.

Advantageous Effects of Invention

The present invention provides a cemented carbide composite material having high-temperature strength and capable of suppressing breakage and peeling of the composite material.

BRIEF DESCRIPTION OF DRAWINGS

FIG. 10 shows an image of the measurement result by EPMA of the cemented carbide composite material.

DESCRIPTION OF EMBODIMENTS

The following describes a cemented carbide composite material, a method for producing the cemented carbide composite material, and a cemented carbide tool that are embodiments of the present invention, with reference to the drawings.

[Cemented Carbide Composite Material]

Figure 1A:
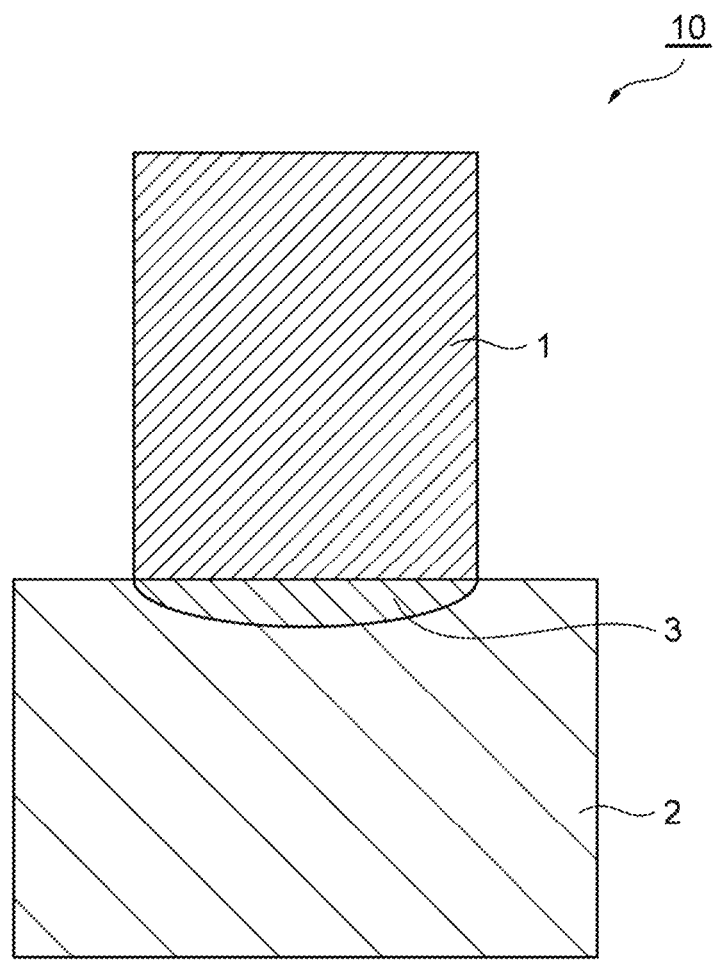
FIG. 1A is a schematic cross-sectional view showing one example of a cemented carbide composite material according to one embodiment of the present invention.
Figure 1B:
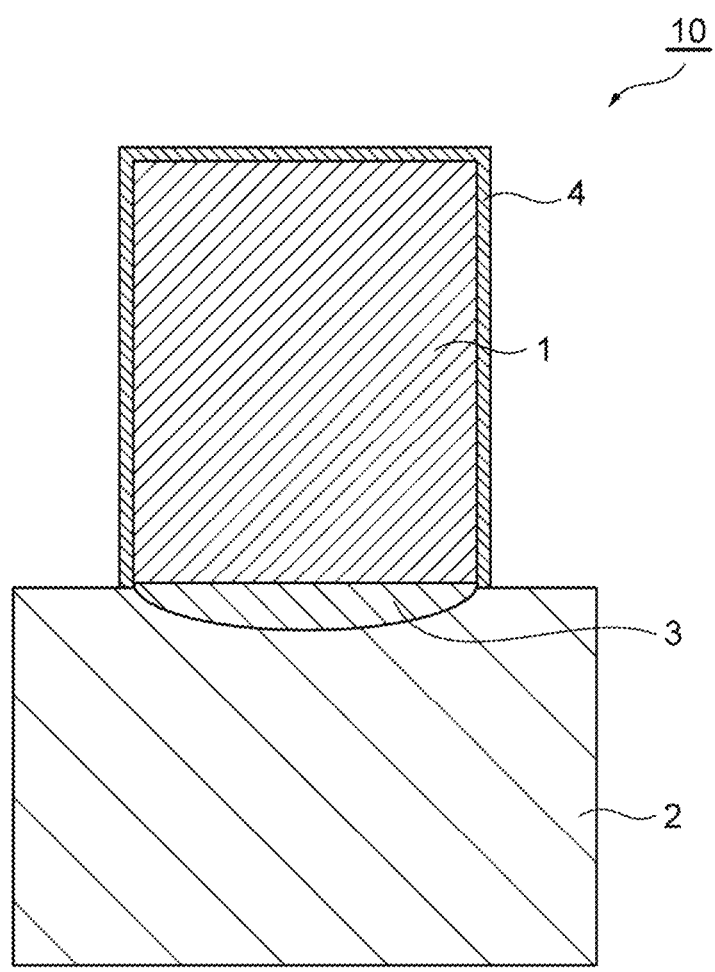
FIG. 1B is a schematic cross-sectional view showing one example of a cemented carbide composite material according to one embodiment of the present invention.
Figure 2:
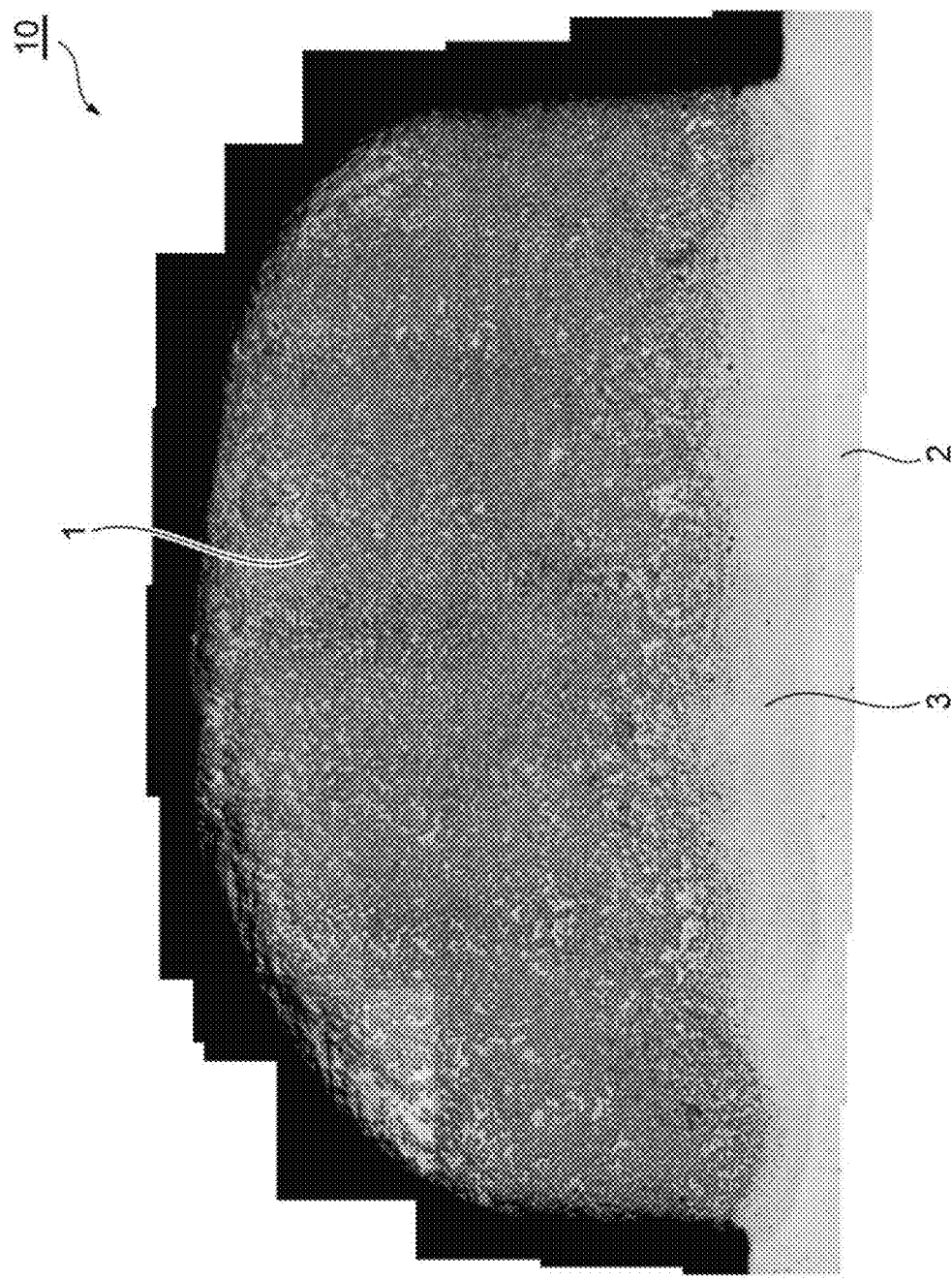
FIG. 2 is a photograph showing one example of the cemented carbide composite material of FIG. 1A in cross section.

FIG. 1A and FIG. 1B are schematic cross-sectional views showing one example of a cemented carbide composite material 10 according to one embodiment of the present invention. FIG. 2 is a photograph showing one example of the cemented carbide composite material 10 of FIG. 1A in cross section.

The cemented carbide composite material 10 of the present embodiment includes: a cemented carbide part 1 made of WC—Co-based cemented carbide mainly containing tungsten carbide (WC) and cobalt (Co) (containing WC and Co that account for 50 mass % or more in total); and a substrate part 2 made of metal containing nickel (Ni) or Co that accounts for 50 mass % or more in total. The cemented carbide composite material 10 includes an intermediate layer 3 between the cemented carbide part 1 and the substrate part 2, the intermediate layer 3 containing components of the cemented carbide part 1 and components of the substrate part 2. This intermediate layer 3 includes a part having a gamma phase fraction of 80% or more and having Vickers hardness less than 700 HV. The WC—Co-based cemented carbide making up the cemented carbide part 1 has excellent high-temperature strength and abrasion resistance. The cemented carbide composite material 10 having such a configuration accordingly has excellent high-temperature strength and suppresses breakage and peeling.

The gamma phase is called austenitic phase as well, and has a face-centered cubic (FCC) structure. The gamma phase fraction can be measured by scanning the range of 200 μm×200 μm, for example, by electron backscatter diffraction (EBSD) and can be calculated based on the area of the gamma phase in the measured screen. Vickers hardness can be measured by a commercially available Vickers hardness tester.

In the example of FIG. 1B, the cemented carbide composite material 10 has a coating layer 4 on the surface of the cemented carbide part 1. In one example, the coating layer may be formed by nitriding the surface of the cemented carbide part 1 or by chemical vapor deposition (CVD) or physical vapor deposition (PVD). The material of the coating layer 4 is not limited especially, which may include titanium carbide (TiC), titanium nitride (TiN), titanium carbonitride (TiCN), aluminum oxide ($Al_2O_3$), titanium aluminium nitride (TiAlN), or chromium nitride (CrN). Such a cemented carbide composite material 10 having the coating layer 4 on the surface of the cemented carbide part 1 improves abrasion resistance of the cemented carbide part 1.

The cemented carbide part 1 mainly includes WC—Co-based cemented carbide in which hard WC particles are dispersed in a metal phase having Co as a bonded phase. As the amount of Co increases, toughness of the cemented carbide part 1 improves. That is, the cemented carbide part 1 with high Co content suppresses breakage or peeling of the cemented carbide part 1 during forming. An increase of the Co content, however, degrades the strength and hardness of the cemented carbide part. Preferable Co content of the cemented carbide part is 25 mass % or more and 50 mass % or less. This prevents breakage or peeling of the cemented carbide part 1 of the cemented carbide composite material 10, and so the cemented carbide composite material can have the toughness, strength and hardness suitable for the use as a tool, for example. In one example, the cemented carbide part 1 desirably has Vickers hardness of 400 HV or higher and 1000 HV or less.

In one example, the cemented carbide part 1 may contain a small amount of chromium (Cr), vanadium (V), titanium (Ti), tantalum (Ta), and niobium (Nb). Cr and V suppress grain growth of WC particles and improves oxidation resistance. Ti, Ta and Nb have the effect of enlarging sound phase of the cemented carbide structure. Finer WC particles improve the strength and toughness. The WC particles included in the cemented carbide part 1 therefore desirably have the average particle diameter of 50 μm or less. The average particle diameter of the WC particles included in the cemented carbide part 1 can be obtained based on the average of equivalent circle diameters of the particles on a test plane prepared by cutting the cemented carbide part 1.

The substrate part 2 is made of a metal material mainly containing Ni or Co or both of them. In one example, the substrate part 2 includes Ni-based alloy, Co-based alloy, pure Ni, pure Co, mixed alloy of Ni and Co, and the mixture of them with another metal element or non-metal element other than metal elements, as needed, and contains 50 mass % or more of at least one of Ni and Co or 50 mass % or more of both of them in total. Some components or shapes of the cemented carbide may generate peeling or breakage during forming. The substrate part 2 made of pure Ni or pure Co is desirable because this suppresses a defect due to added elements. Pure Ni or pure Co has low hardness, and so weakens the binding force to the cemented carbide part 1 from the substrate part 2. This reduces the stress during additive manufacturing and so suppresses peeling. When functions of the substrate part 2 have to be adjusted, such as in the case of requiring high hardness for the substrate part 2 as well, a desirable material of the substrate part 2 is alloy, such as Ni-based alloy or Co-based alloy.

The substrate part 2 made of alloy (alloy part) mainly includes Ni or Co, or both of them, and is Ni-based alloy, Co-based alloy or mixed alloy of Ni and Co. In one example, the Ni-based alloy is an alloy containing 50 mass % or more of Ni, and also containing at least one type of elements selected from chromium (Cr), cobalt (Co), molybdenum (Mo), tungsten (W), niobium (Nb), aluminum (Al), titanium (Ti), iron (Fe), zirconium (Zr), tantalum (Ta), vanadium (V), hafnium (Hf), manganese (Mn), silicon (Si), lanthanum (La), magnesium (Mg), carbon (C), boron (B), and the like. The Ni-based alloy typically is an alloy having a gamma phase as the main phase. This means that, when the alloy part includes Ni-based alloy, the intermediate layer has high gamma phase fraction. This suppresses extreme deterioration of the toughness.

In one example, when the alloy part includes Ni-based alloy, the composition of the alloy part is 8 mass % or more and 22 mass % or less of Cr, 28.5 mass % or less of Co, 14.5 mass % or less of Mo, 12 mass % or less of W, 5 mass % or less of Nb, 6.1 mass % or less of Al, 4.7 mass % or less of Ti, 18.5% or less of Fe, 0.1 mass % or less of Zr, 4 mass % or less of Ta, 1.0 mass % or less of V, 1.3 mass % or less of Hf, 0.05 mass % or more and 0.7 mass % or less of Mn, 0.5 mass % or less of Si, 0.02 mass % or less of La, 0.02 mass % or less of Mg, 0.02 mass % or more and 0.2 mass % or less of C, 0.05 mass % or less of B, and Ni as the balance.

In one example, the Co-based alloy is an alloy containing 50 mass % or more of Co, and also containing at least one type of elements selected from Cr, Ni, W, Mo, V, Fe, Mn, Si, C and the like. The Co-based alloy contains Co as the main component that is the same as the bonded phase of the cemented carbide part 1. When the alloy part includes Co-based alloy, the composition of the alloy part is 30 mass % or less of Cr, 22 mass % or less of Ni, 15 mass % or less of W, 4.25 mass % or less of Mo, 1.7 mass % or less of V, 50 mass % or less of Fe, 2.0 mass % or less of Mn, 1.0 mass % or less of Si, 1.1 mass % or less of C, and Co as the balance.

For the mixed alloy of Ni and Co, when Co-based alloy and Ni-based alloy are mixed (Ni—Co based alloy), for example, the mixed alloy contains 50 mass % or more of Ni and Co in total, and also contains additive elements to be used for the Co-based alloy and the Ni-based alloy as stated above.

The alloy part with less hardness weakens the binding force to the cemented carbide part 1 from the alloy part. This reduces the stress during additive manufacturing and so suppresses peeling. When the cemented carbide composite material 10 is used as a tool, for example, the material is required to have a certain degree of hardness. The alloy part therefore preferably has Vickers hardness of 200 HV or higher and less than 500 HV. Such an alloy part 2 of the cemented carbide composite material 10 has hardness suitable for the use as a tool, for example.

The intermediate layer 3 is formed between the cemented carbide part 1 and the substrate part 2, and is a region containing components of the cemented carbide part 1 and components of the substrate part 2. During production of the cemented carbide composite material 10, the intermediate layer 3 is generated at the joint interface between the cemented carbide part 1 and the substrate part 2 and in the vicinity of the joint interface. The intermediate layer 3 includes a part having a gamma phase fraction of 80% or more and having Vickers hardness less than 700 HV. This allows the intermediate layer 3 to have less embrittlement phase due to martensitic transformation, for example, and have toughness that is resistant to thermal stress applied during the production of the cemented carbide composite material 10. The intermediate layer 3 with Vickers hardness less than 700 HV suppresses breakage in the intermediate layer 3 during the production of the cemented carbide composite material 10. The part of 700 HV is preferably 20 vol % or more of the intermediate layer as a whole, more preferably 50 vol % or more, and still more preferably 80 vol % or more.

Preferably from the viewpoint of improved toughness and less breakage, the center part of the intermediate layer 3 has the gamma phase fraction of 80% or more and Vickers hardness less than 700 HV. More preferably the center part of the intermediate layer 3 has the gamma phase fraction of 90% or more and Vickers hardness less than 650 HV. From the same viewpoints, the center part of the intermediate layer 3 has Vickers hardness higher than the Vickers hardness of the substrate part 2, i.e., the Vickers hardness of the substrate part 2 is preferably lower than the Vickers hardness of the center part of the intermediate layer 3. In one example, the center part of the intermediate layer 3 refers to the round region from the center of the thickness direction of the intermediate layer 3 and having a radius of 30% of the thickness of the intermediate layer.

From the viewpoint of improved toughness, the intermediate layer 3 desirably has less content of $M_6C$ type carbide. The presence of $M_6C$-type carbide can be determined by X-ray diffraction (XRD), for example.

To suppress deterioration in fatigue life of the cemented carbide composite material 10, the intermediate layer 3 desirably has the porosity fraction of 1% or less. In one example, the porosity fraction can be calculated by determining the area of a sample cross section and obtaining the area of visible gaps through the observation of the sample cross section.

As shown in FIG. 2, the presence of the intermediate layer 3 can be determined based on the external appearance. Observation under a microscope may fail to clearly determine the boundary between the cemented carbide part 1 and the intermediate layer 3 and the boundary between the substrate part 2 and the intermediate layer 3. In this case, the boundary between the cemented carbide part 1, the substrate part 2 and the intermediate layer 3 may be specified by an electron probe micro analyzer (EPMA), for example.

More specifically as shown in FIG. 2, the cemented carbide composite material 10 is cut so as to enable the observation of the cemented carbide part 1 and the substrate part 2 on the same cross section. As shown in the example of FIG. 2, the cemented carbide part 1 and the substrate part 2 can be distinguished easily. Next line analysis by the EPMA is conducted with the steps of 20 μm from the cemented carbide part 1 to the substrate part 2 while setting the setting value of the spot size at 0 μm to measure the number of counted X-rays for tungsten.

Figure 3:
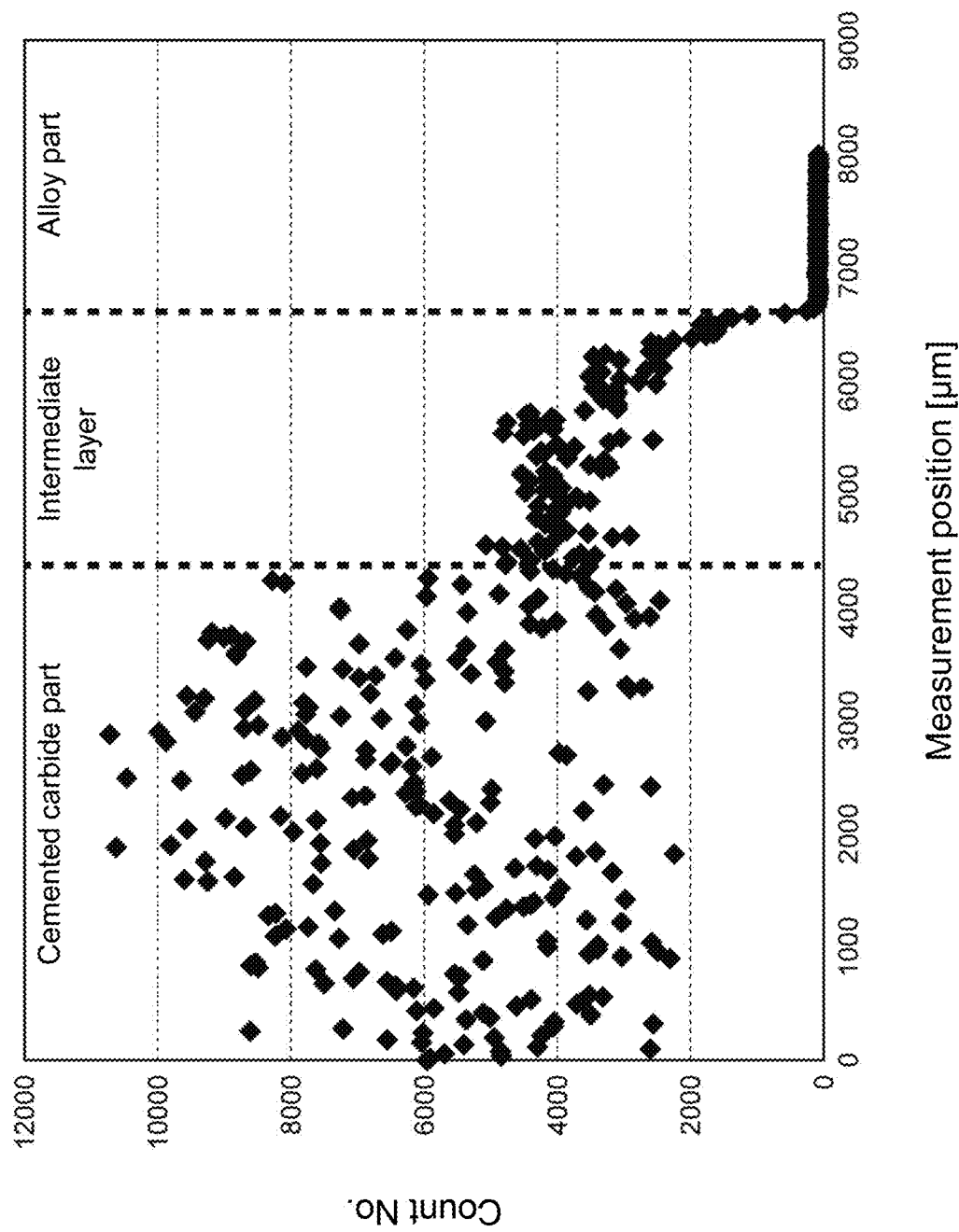
FIG. 3 is a graph showing one example of the measurement result by the EPMA of the cemented carbide composite material shown in FIG. 2.

FIG. 3 is a graph showing one example of the measurement result by the EPMA of the cemented carbide composite material 10 shown in FIG. 2. In FIG. 3, the horizontal axis represents the measurement positions [μm] that is the distance from the measurement starting point, and the vertical axis represents the number of counted X-rays for tungsten. In one example, the boundary between the cemented carbide part 1 and the intermediate layer 3 and the substantive boundary between the intermediate layer 3 and the substrate part 2 can be specified based on the fluctuating width of the number of counted X-rays for tungsten.

Specifically while the fluctuating width of the counted number between the mutually adjacent analysis points is about ±10% in the intermediate layer 3, the fluctuating width of the counted number between the mutually adjacent analysis points is about ±20% or more in the cemented carbide part 1. The counted number and the fluctuating width of the counted number are very small in the substrate part 2 as compared with in the cemented carbide part 1 and the intermediate layer 3. FIG. 3 shows a change in the fluctuating width of the counted number of W, and this is because the intermediate layer contains the components of the cemented carbide part and the substrate part. In this way the counted number of X-rays for tungsten may be measured on the cross section of the cemented carbide composite material 10 by EPMA to define the boundary between the cemented carbide part 1 and intermediate layer 3 and the substantive boundary between the intermediate layer 3 and the substrate part 2.

As described above the present embodiment provides the cemented carbide composite material 10 including the cemented carbide part 1 made of cemented carbide and the substrate part 2 made of non-cemented carbide and having high-temperature strength as compared with conventional materials and capable of suppressing breakage and peeling of the composite material.

[Method for Producing Cemented Carbide Composite Material]

Figure 4:
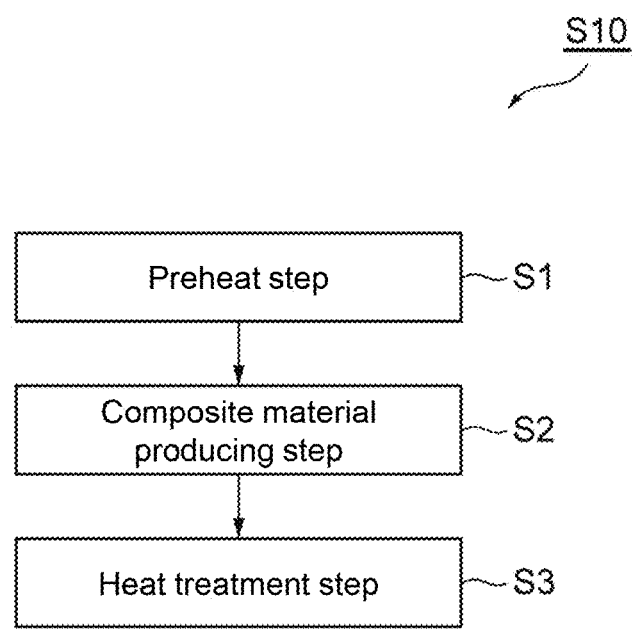
FIG. 4 is a flowchart showing one example of a method for producing a cemented carbide composite material according to one embodiment of the present invention.

FIG. 4 is a flowchart of a method S10 for producing a cemented carbide composite material according to one embodiment of the present invention. The method S10 for producing a cemented carbide composite material of the present embodiment produces the cemented carbide composite material 10 as stated above including the cemented carbide part 1 made of WC—Co-based cemented carbide, and the substrate part 2 made of metal containing Ni or Co that accounts for 50 mass % or more in total. This method S10 for producing the cemented carbide composite material includes a preheat step S1 and a composite material producing step S2. The embodiment of the present invention may include a heat treatment step S3.

The preheat step S1 preheats the substrate part 2 made of metal containing Ni or Co that accounts for 50 mass % or more in total so that the substrate part 2 reaches a temperature of 350° C. or higher. In one example, the preheat step S1 may be conducted using high-frequency induction heating, a gas burner, an infrared electric heater, a heating furnace, or irradiation with electron beams or laser. Preferably the preheat step S1 preheats the substrate part 2 at a temperature of 500° C. or higher. Preferably the preheat step S1 preheats the substrate part 2 at a temperature of 1300° C. or lower from the viewpoint of preventing the deformation due to the self weight.

The composite material producing step S2 forms the cemented carbide part 1 on the substrate part 2 by additive manufacturing, and produces the cemented carbide composite material 10 having the intermediate layer 3 between the substrate part 2 and the cemented carbide part 1, the intermediate layer 3 containing the components of the substrate part 2 and the components of the cemented carbide part 1. The additive manufacturing is not limited especially, which may include directional energy deposition, such as laser metal deposition, powder bed fusion, and plasma-transferred-arc powder welding. Additive manufacturing by directional energy deposition fuses material powder of WC—Co-based cemented carbide with a heat source that is any one of laser, an electron beam, plasma, and arc, and makes the fused material powder adhere to the substrate part 2 for solidifying to stack the cemented carbide part 1 on the substrate part 2 for forming.

The composite material producing step S2 forms the cemented carbide part 1 on the substrate part 2 by additive manufacturing, so as to mix the components of the substrate part 2 and the components of the cemented carbide part 1 at the interface of the cemented carbide part 1 and the substrate part 2 and in the vicinity of the interface. This generates the intermediate layer 3 between the cemented carbide part 1 and the substrate part 2, the intermediate layer 3 containing components of the cemented carbide part 1 and components of the substrate part 2, and so produces the cemented carbide composite material 10 having the intermediate layer 3 between the cemented carbide part 1 and the substrate part 2.

As stated above, the preheat step S1 preheats the substrate part 2 at a temperature of 350° C. or higher, and this suppresses breakage and peeling between the cemented carbide part 1 and the substrate part 2 at the composite material producing step S2. Specifically the preheat step S1 preheats the substrate part 2 at a certain temperature or higher, and this reduces the cooling rate of the materials that are fused and bonded during the additive manufacturing of the cemented carbide part 1 at the following composite material producing step S2, and so suppresses hardening or breakage at a low temperature of the cemented carbide part 1 and hydrogen diffusion.

The preheating of the substrate part 2 at the preheat step S1 also enables gentle temperature gradient of the cemented carbide part 1 during additive manufacturing at the composite material producing step S2, and so suppresses deformation due to thermal stress and reduces the residual stress. Preheating of the substrate part 2 at a temperature of 500° C. or higher at the preheat step S1 suppresses small cracks at the composite material producing step S2.

The heat treatment step S3 heat treats the cemented carbide composite material 10 at a temperature of 1000° C. or higher and 1300° C. or lower. This allows diffusion and dissipation of eta phase and free carbons that the formed cemented carbide part 1 has at the composite material producing step S2. The producing method of the present embodiment therefore preferably performs the heat treatment step S3. These eta phase and free carbons are embrittlement phase, and the presence of them degrades the toughness of the cemented carbide part 1.

The heat treatment step S3, which is to diffuse and eliminate the eta phase and free carbons in the cemented carbide part 1, therefore improves the toughness of the cemented carbide part 1. From the viewpoint of effectively diffusing and eliminating eta phase and free carbons in the cemented carbide part 1 to improve the toughness of the cemented carbide part 1, the temperature to heat treat the cemented carbide composite material 10 at the heat treatment step S3 is preferably 1200° C. or higher and 1300° C. or lower.

The method S10 for producing the cemented carbide composite material of the present embodiment may have a cutting step to cut the cemented carbide composite material 10 before and after the heat treatment step S3. This improves the shape accuracy of the cemented carbide composite material 10.

[Cemented Carbide Tool]

Figure 5:
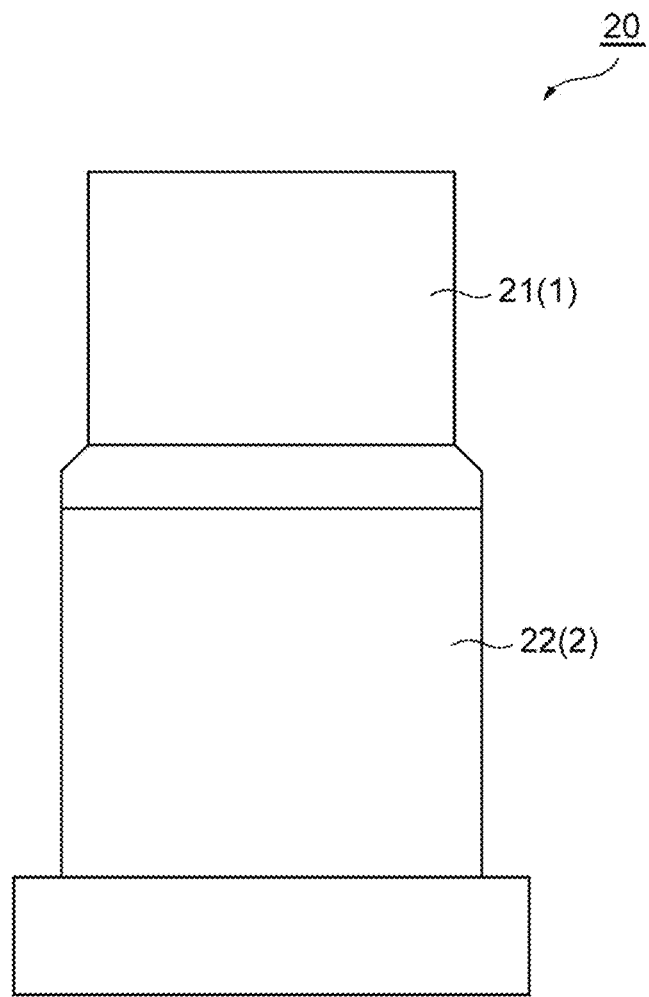
FIG. 5 is a front view showing one example of a cemented carbide tool according to one embodiment of the present invention.

Referring to FIG. 5 together with FIG. 1A to FIG. 4, the following describes a cemented carbide tool according to one embodiment of the present disclosure. FIG. 5 is a front view showing one example of a cemented carbide tool 20 according to one embodiment of the present invention. In one example, the cemented carbide tool 20 is a punch of a warm forging die. The cemented carbide tool 20 of the present embodiment is not limited to such a punch of a warm forging die. In one example, the cemented carbide tool 20 has a machining part 21, and may be used as a tool that has the acting face at the machining part 21 to cut, shape, move, and hold a workpiece.

The cemented carbide tool 20 is a tool including the cemented carbide composite material 10 as stated above. The cemented carbide tool 20 has the machining part 21 to machine a workpiece, and a base 22 to support this machining part. The machining part 21 of the cemented carbide tool 20 is the cemented carbide part 1 of the cemented carbide composite material 10 as stated above, and the base 22 of the cemented carbide tool 20 is the substrate part 2 of the cemented carbide composite material 10 as stated above. That is, the cemented carbide tool 20 is produced by the method S10 for producing a cemented carbide composite material as stated above. Although not shown in FIG. 5, the cemented carbide tool 20 has an intermediate layer 3 between the cemented carbide part 1 making up the machining part 21 and the substrate part 2 making up the base 22.

Conventional forging dies are often made of tool steel that has excellent high-temperature strength and abrasion resistance. For hot forging, however, such tool steel mainly containing Fe will be softened at the forging temperature, and causes a problem of short life of the die. The cemented carbide tool 20 of the present embodiment includes the cemented carbide part 1 at the machining part 21, and so has excellent high-temperature strength and gives long life to the die.

A tool made of conventional cemented carbide is produced by mixing WC particles and Co-based alloy as binder and sintering them. While cemented carbide is hard and has excellent abrasion resistance, it has poor toughness and so deteriorates due to mechanical impact and thermal shock involved in the thermal history. To improve the toughness of the cemented carbide, an effective way is to increase the Co content of the Co-based alloy. This, however, causes a problem of a large dimension change during sintering.

The cemented carbide tool 20 of the present embodiment is produced by the method S10 for producing a cemented carbide composite material based on the additive manufacturing as stated above. This enables near-net-shape forming of the machining part 21 having a complexed shape, and so enables the forming of a die having a function that conventional dies do not have, such as temperature control using a cooling channel.

The machining part 21 formed by the additive manufacturing has high density as compared with conventional tools produced by sintering, and so has the advantage of a small dimension change during heat treatment after forming. The tool is made of the cemented carbide composite material 10 having the structure as stated above, and so suppresses peeling or breakage between the machining part 21 and the base 22 of the tool that is produced by forming the machining part 21 that is the cemented carbide part 1 on the base 22 that is the substrate part 2 having a different composition from the cemented carbide part 1.

Specifically the base 22 is the substrate part 2 having high gamma phase fraction, and this increases the joint strength between the machining part 21 that is the cemented carbide part 1 and the base 22, and forms the intermediate layer 3 having good toughness and hardness. Specifically the substrate preferably has the gamma phase fraction of 80% or more, and more preferably 90% or more. The present embodiment therefore provides a crack-free cemented carbide tool 20 free from peeling and breakage between the machining part 21 and the base 22. The cemented carbide tool 20 therefore has a longer life when the tool is used at a high temperature during hot forging, for example. Although the raw material of the cemented carbide is expensive, the tool is made of such cemented carbide at the machining part 21 acting on a workpiece, and is made of a different material at the other part. This reduces the cost for the raw material.

That is a detailed description of the embodiment of the present invention with reference to the drawings. The specific configuration of the present invention is not limited to the above-stated embodiment, and the design may be modified variously without departing from the spirits of the present invention. The present invention also covers such modified embodiments.

EXAMPLES

Firstly as the materials of the substrate part, alloys having three different compositions from No.1 to No.3 shown in Table 1 were prepared. The units for the compositions shown in Table 1 are mass %, and "Bal" indicates the "balance". Specifically No.1 denotes carbon steel, No.2 denotes austenitic stainless steel, and No.3 denotes Ni-based alloy. Next Vickers hardness of the prepared three types of alloy was measured. The result shows 140 [HV] for No.1, 192 [HV] for No.2, and 307.5 [HV] for No.3. The measurements of the prepared three types of alloy about gamma phase fraction by EBSD show 10% or less for No.1, and 95% between 99% for No.2 and No.3.

TABLE 1

| No. | C | Si | Mn | P | S | Ni | Cr | Mo | Co | Cu | Al | Ti | Fe | B |
|---|---|---|---|---|---|---|---|---|---|---|---|---|---|---|
| 1 | 0.11 | 0.17 | 1.4 | 0.014 | 0.002 | — | — | — | — | — | — | — | Bal | — |
| 2 | 0.05 | 0.8 | 1.6 | 0.03 | 0.03 | 10.2 | 18.5 | — | — | — | — | — | Bal | — |
| 3 | 0.03 | 0.08 | 0.05 | 0.004 | 0.0002 | Bal | 18.58 | 3.08 | 0.04 | 0.02 | 0.56 | 0.94 | 24.19 | 0.0038 |

Example 1

The Ni-based alloy of No.3 shown in Table 1 was used as the substrate part, and the preheat step was conducted to preheat this substrate part at 350° C. Next the composite material producing step was conducted to form a cemented carbide part on the substrate part by additive manufacturing so as to produce a cemented carbide composite material having an intermediate layer between the substrate part and the cemented carbide part, the intermediate layer including the components of the substrate part and the components of the cemented carbide part. This additive manufacturing was conducted using WC—Co cemented carbide powder having the Co content of 40 mass % as the material of the additive manufacturing, and by laser deposition that was the directional energy deposition. The cemented carbide part was formed by depositing the material so that the height reached 10 mm with 8 paths for one layer, so as to stack about 20 layers. Table 2 shows the conditions for the additive manufacturing. The conditions on the additive manufacturing shown in Table 2 were set so as to keep the amount of heat input to the powder relatively low and so suppress breakage between the substrate part and the cemented carbide part.

TABLE 2

| Laser output [W] | Rate [mm/min] | Input heat amount [kJ/cm] | Feeding amount of powder [g/cm] | Input heat amount to powder [kJ/g] | Defocus length [mm] | Carrier gas flow rate [L/min] | Shield gas flow rate [L/min] | Side gas flow rate [L/min] |
|---|---|---|---|---|---|---|---|---|
| 1200 | 100 | 7.2 | 0.2 | 36 | 20 | 5.5 | 20 | 10 |

Example 2

The cemented carbide composite material was produced similarly to Example 1 as stated above except that the temperature of the substrate part at the preheat step was set at 500° C.

Example 3

The cemented carbide composite material was produced similarly to Example 1 as stated above except that the temperature of the substrate part at the preheat step was set at 600° C.

Comparative Example 1

The cemented carbide composite material was produced similarly to Example 1 as stated above except that the carbon steel of No.1 in Table 1 was used as the substrate part and the preheat step was skipped.

Comparative Example 2

The cemented carbide composite material was produced similarly to Example 1 as stated above except that the carbon steel of No.1 in Table 1 was used as the substrate part.

Comparative Example 3

The cemented carbide composite material was produced similarly to Example 1 as stated above except that the austenitic stainless steel of No.2 in Table 1 was used as the substrate part and the preheat step was skipped.

Comparative Example 4

The cemented carbide composite material was produced similarly to Example 1 as stated above except that the austenitic stainless steel of No.2 in Table 1 was used as the substrate part.

Comparative Example 5

The cemented carbide composite material was produced similarly to Example 1 as stated above except that the preheat step was skipped.

For the produced cemented carbide composite materials from Example 1 to Example 3 and Comparative Example 1 to Comparative Example 5, liquid penetrant examination and cross-sectional observation were conducted to check breakage and peeling. Table 3 shows the result of the liquid penetrant examination and cross-sectional observation. Table 3 shows "good", "pass" and "fail" for the "presence of breakage and peeling".

TABLE 3

| | Alloy No. | Preheat temp. | presence of breakage and peeling |
|---|---|---|---|
| Ex. 1 | 3 | Preheat 350° C. | Pass |
| Ex. 2 | 3 | Preheat 500° C. | Good |
| Ex. 3 | 3 | Preheat 600° C. | Good |
| Comp. Ex. 1 | 1 | Not preheat | Fail |
| Comp. Ex. 2 | 1 | Preheat 350° C. | Fail |
| Comp. Ex. 3 | 2 | Not preheat | Fail |
| Comp. Ex. 4 | 2 | Preheat 350° C. | Fail |
| Comp. Ex. 5 | 3 | Not preheat | Fail |

Figure 6:
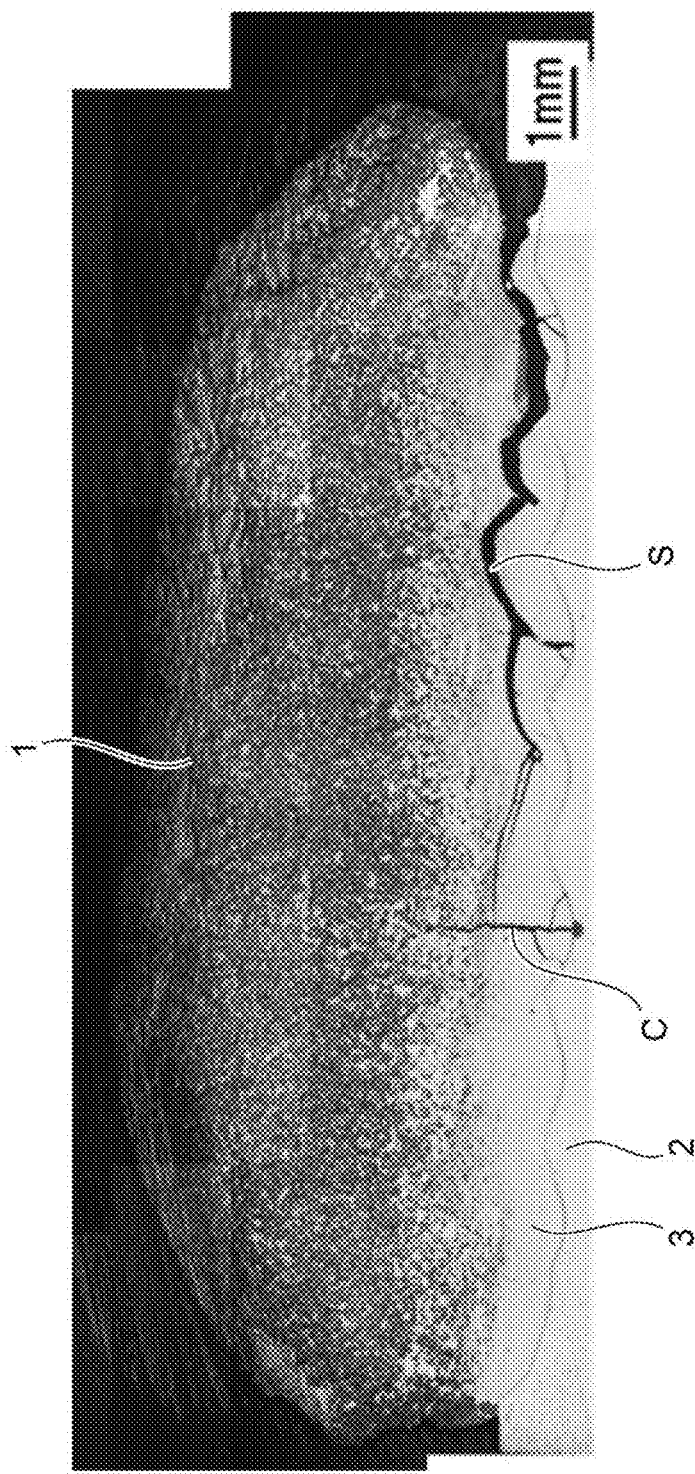
FIG. 6 is a photograph showing one example of peeling and breakage between the cemented carbide part and the substrate part in cross section.

FIG. 6 is a photograph showing examples of peeling and breakage between the cemented carbide part 1 and the substrate part 2 in cross section found in Comparative Example 1 to Comparative Example 5. The "presence of breakage and peeling" in Table 3 shows breakages generated at the intermediate layer 3, and peeling S indicates a horizontal breakage along the boundary between the cemented carbide part 1 and the intermediate layer 3 or between the intermediate layer 3 and the substrate part 2, and breakage C indicates the other breakages. Determination on the breakages is as follows. The materials without breakage C and peeling S were determined as "good", the materials with breakage C and without peeling S were determined as "pass", and the materials with breakage C and peeling S were determined as "fail".

As shown in Table 3, the intermediate layers 3 from Comparative Example 1 to Comparative Example 5 had both of breakage and peeling, and so were determined as "fail". Especially Comparative Example 1 and Comparative Example 2 including the substrate part 2 made of Fe-based alloy containing carbon steel and so mainly containing Fe had obvious peeling S, irrespective of the preheat step. The cemented carbide composite materials of Example 1 to Example 3 had no peeling S. Particularly the cemented carbide composite materials of Example 2 to Example 3 only had no breakage and peeling in the intermediate layer 3 at all.

Figure 7:
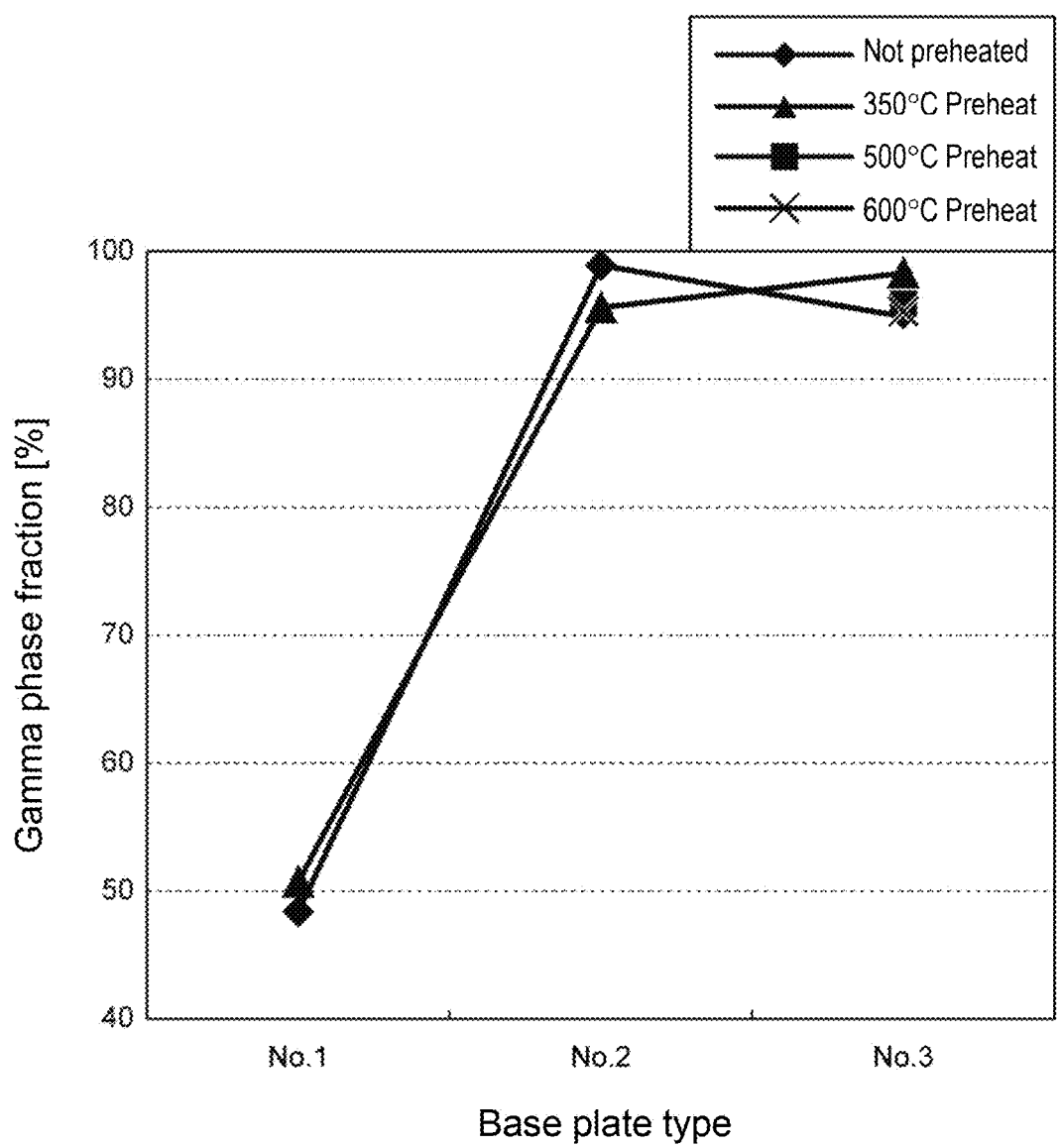
FIG. 7 is a graph showing the gamma phase fraction at the intermediate layer of a cemented carbide composite material.

FIG. 7 is a graph showing the gamma phase fraction at the intermediate layer 3 of the cemented carbide composite materials of Example 1 to Example 3 and Comparative Example 1 to Comparative Example 5. In FIG. 7, the horizontal axis represents the types (alloy No) of the base plate (substrate part). The gamma phase fraction was measured by scanning the range of 200 μm×200 μm at a center part of the intermediate layer 3 in a cross section of the cemented carbide composite material by EBSD with the scan-step of 0.7 μm, and was calculated based on the area of the gamma phase in the measured screen. Comparative Example 1 and Comparative Example 2 (alloy No.1) having obvious peeling S had the gamma phase fraction of about 50%, and had the remaining half that was alpha phase (body-centered cubic) and a third phase. Comparative Example 3 and Comparative Example 4 (alloy No.2), which had relatively less breakage C and peeling S as compared with Comparative Example 1 and Comparative Example 2, as well as Comparative Example 5 and Example 1 to Example 3 (alloy No.3) had the gamma phase fraction of 90% or more.

Figure 8:
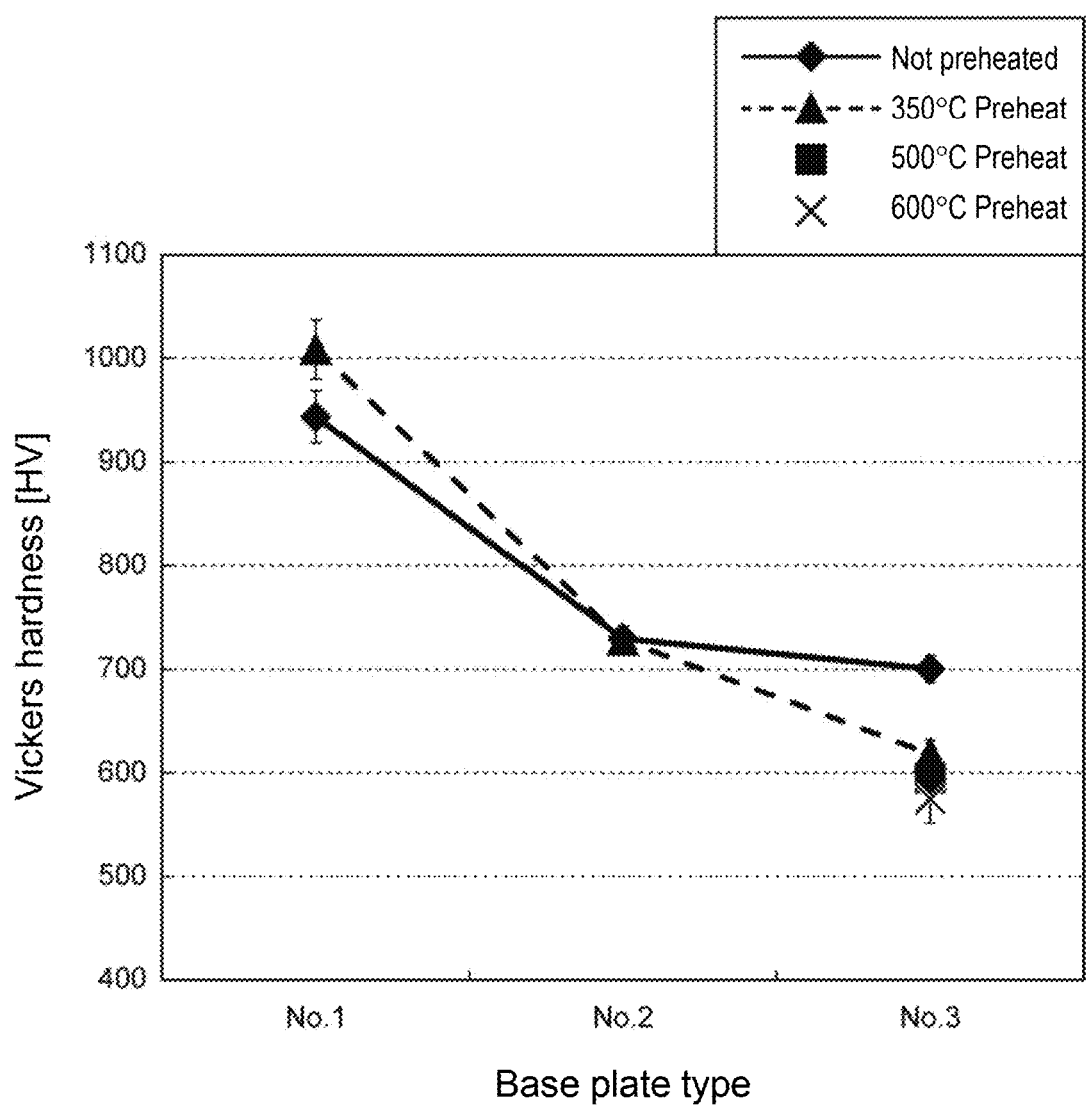
FIG. 8 is a graph showing the result of Vickers hardness test at the intermediate layer of the cemented carbide composite material.

FIG. 8 is a graph showing the result of Vickers hardness test at the intermediate layer 3 of the cemented carbide composite materials of Example 1 to Example 3 and Comparative Example 1 to Comparative Example 5. Vickers hardness was measured by M-type micro-Vickers hardness tester produced by Shimadzu Corporation. The test load was 500 gf, and the holding time was 20 s. The measured position was a center part of the intermediate layer 3 in a cross section of the composite material (more specifically a position moved by about 1 to 2 mm from the boundary between the substrate and the intermediate layer toward the cemented carbide part). The intermediate layers 3 of Comparative Example 1 and Comparative Example 2 (alloy No.1) had Vickers hardness that was a very high value of 900 or more. Considering this with the measurement result by EBSD as stated above, martensitic transformation presumably occurred during the course of rapid fusing and rapid solidifying of the additive manufacturing material during the additive manufacturing of the cemented carbide part 1. The intermediate layers 3 of the cemented carbide composite materials of Example 1 to Example 3 (alloy No.3), which had no peeling S and porosity, had Vickers hardness less than 700, and had low hardness as compared with the intermediate layers 3 of the other cemented carbide composite materials having peeling S and breakage C.

Figure 9A:
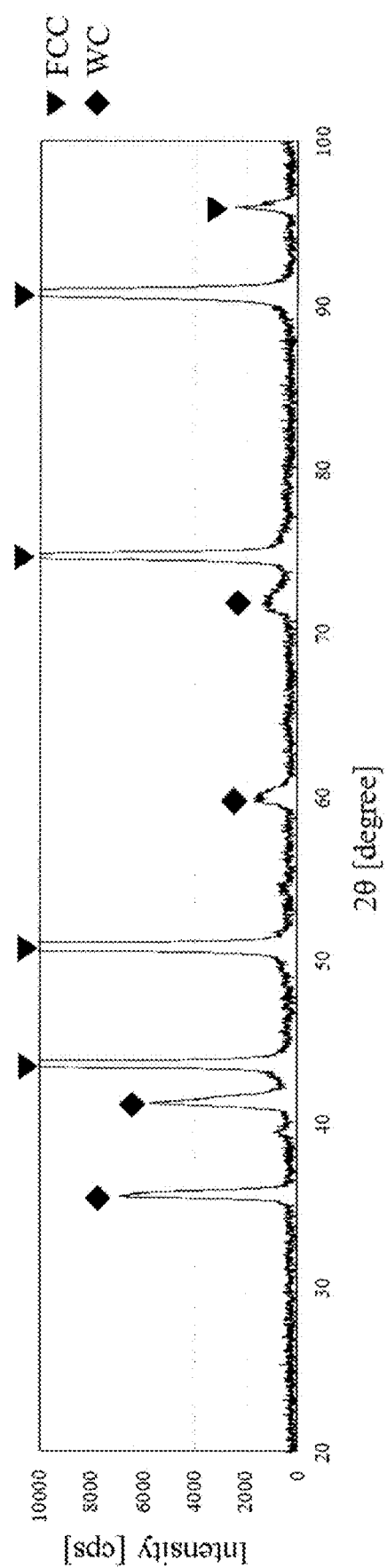
FIG. 9A shows the analysis result of the crystal structure at the intermediate layer by XRD.
Figure 9B:
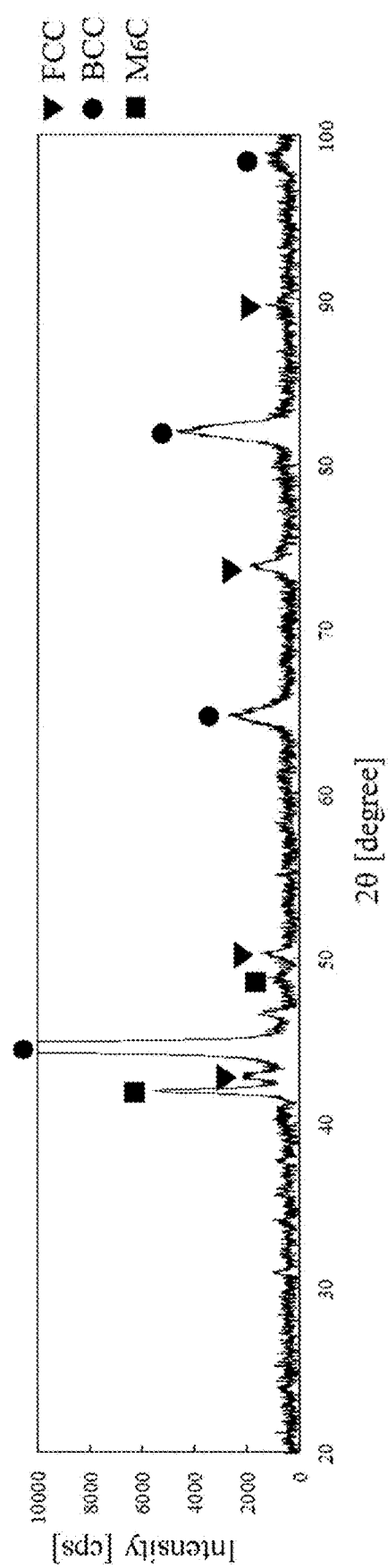
FIG. 9B shows the analysis result of the crystal structure at the intermediate layer by XRD.
Figure 9C:
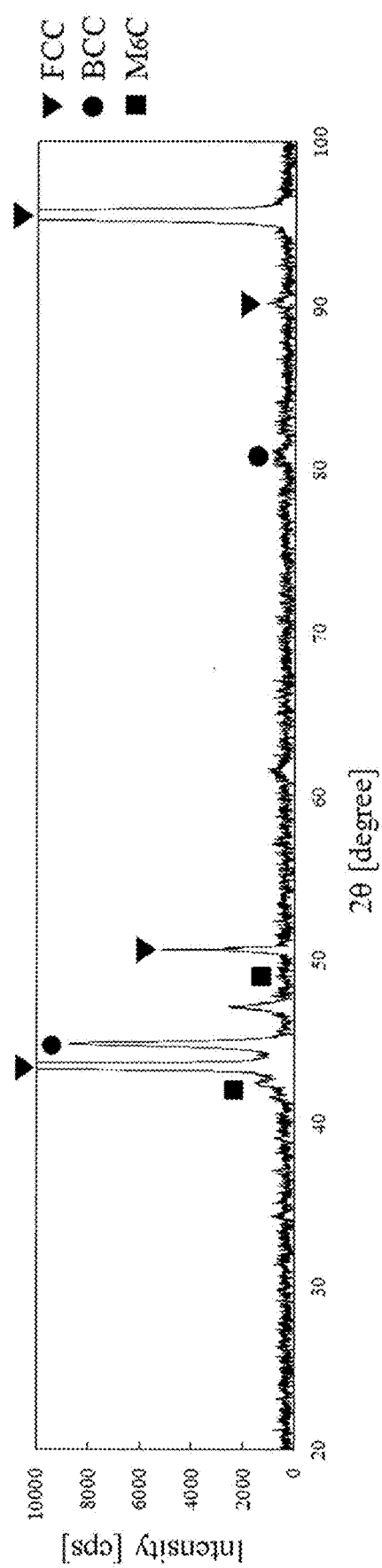
FIG. 9C shows the analysis result of the crystal structure at the intermediate layer by XRD.
Figure 11A:
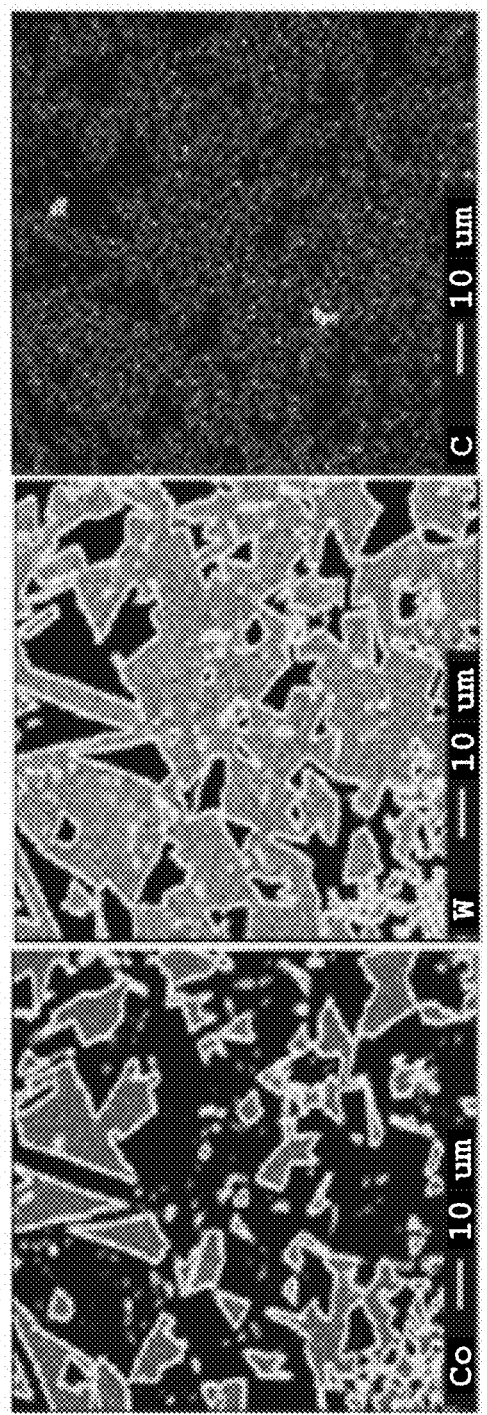
FIG. 11A shows an image of the measurement result by EPMA of the cemented carbide composite material after heat treatment.
Figure 11B:
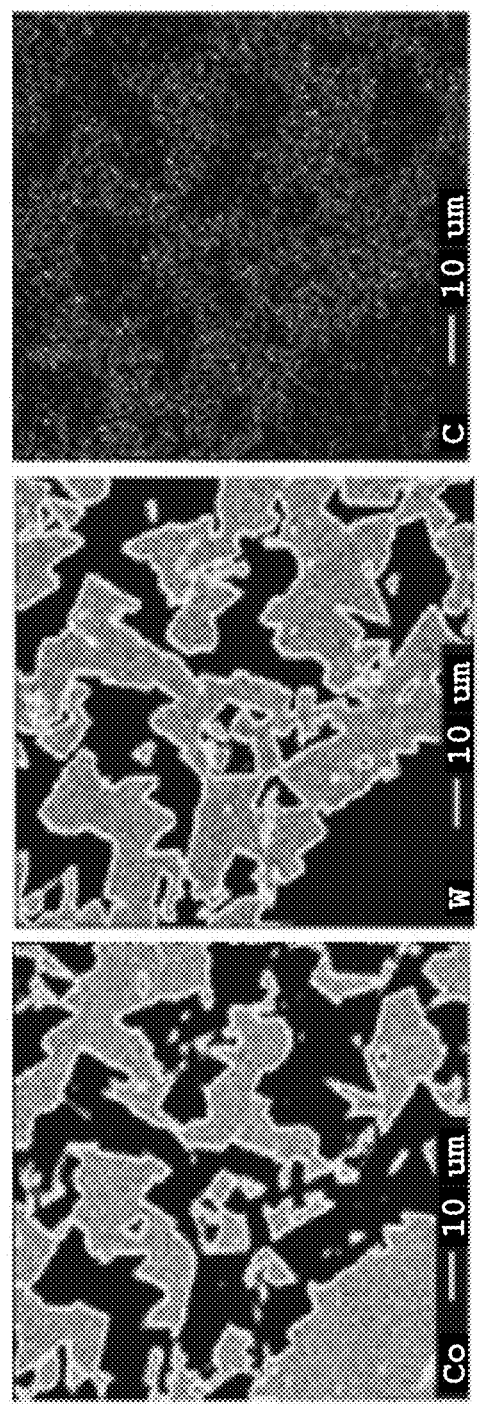
FIG. 11B shows an image of the measurement result by EPMA of the cemented carbide composite material after heat treatment.
Figure 11C:
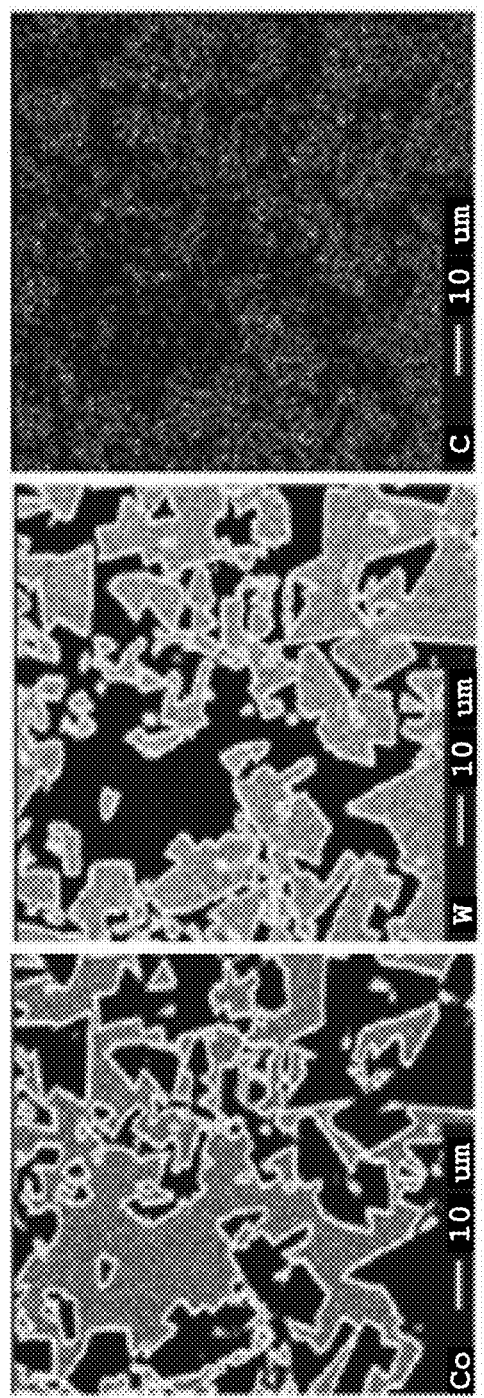
FIG. 11C shows an image of the measurement result by EPMA of the cemented carbide composite material after heat treatment.
Figure 11D:
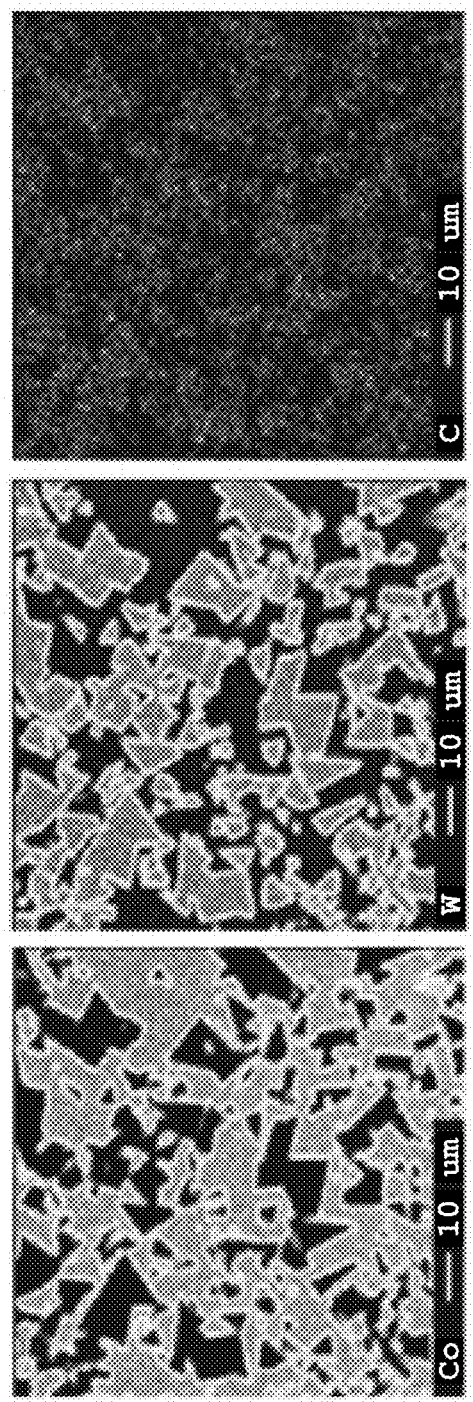
FIG. 11D shows an image of the measurement result by EPMA of the cemented carbide composite material after heat treatment.

FIG. 9A to FIG. 9C show the result of XRD measurement at the intermediate layers 3 of Example 1, Comparative Example 2, and Comparative Example 4. FIG. 9A, FIG. 9B, and FIG. 9C show the measurement results of Example 1, Comparative Example 2, and Comparative Example 4, respectively. XRD was measured at a center part of the intermediate layer 3 in a cross section of the cemented carbide composite material. The beam size was 100 µm, Cu was used as the X-ray source, the operating rate was 0.5 deg/min, and the sampling was 0.01 deg. At the intermediate layer 3 of Example 1, the peak of FCC was mainly detected, and the peak of WC also was detected in addition to the peak of FCC. At the intermediate layers 3 of Comparative Example 2 and Comparative Example 4, BCC as well as FCC was detected. The peak of $M_6C$ type carbide also was detected. $M_6C$ type carbide is a cubical crystal but has a complex crystal structure, and so is an intermetallic compound that is brittler than WC and lowers the toughness. The intermediate layer 3 therefore desirably contains less $M_6C$ type carbide. Specifically the area of the main peak of each crystal structure is found by profile fitting, and these areas are summed. The area of the main peak of the $M_6C$ type carbide is desirably 2% or less of the summed value.

FIG. 10 shows an image of the measurement result by EPMA of the cemented carbide part of the cemented carbide composite material of Example 2. In the cemented carbide part of the cemented carbide composite material of Example 2, WC particles 1b having the particle diameter of a few µm to 20 µm were found in the parent phase 1a mainly made of Co. Eta phase 1c as double carbide of W and Co, and free carbons id that are single and free C components also are found. Since the eta phase 1c and free carbons id function as the embrittlement phase, the structure only made up of the parent phase 1a and the WC particles 1b is more desirable.

Then the cemented carbide composite material of Example 2 was heat treated at a temperature from 1200° C. to 1300° C. FIG. 11A to FIG. 11D show the measurement results by EPMA of the cemented carbide part after heat treatment. FIG. 11A, FIG. 11B, FIG. 11C and FIG. 11D show the measurement results of the cemented carbide composite material that was heat treated at temperatures of 1200° C., 1250° C., 1275° C., and 1300° C., respectively. Dissipation of the eta phase 1c and free carbons id was confirmed for all of the samples. This improves the toughness of the cemented carbide part.

As stated above, in order to obtain a cemented carbide composite material having high joint strength, the method of increasing the toughness of the intermediate layer was examined. Specifically the present inventors focused on the combination of the cemented carbide part and the substrate part, and examined various combinations. As a result, the present inventors confirmed that appropriate selection of a metal having high gamma phase fraction as the substrate part enables an intermediate layer having high joint strength with the cemented carbide part and having good toughness and hardness.

Additive manufacturing is a method to stack a material of the cemented carbide part on a different material of the substrate part for fusing and solidifying, and form these materials. This method often generates breakage because rapid heating and cooling of the materials generate large thermal stress during forming. The cemented carbide part has high strength but has low toughness, and peeling S also is found at the interface between the substrate and the formed object during forming. Such peeling S is generated at a region (intermediate layer 3) where the materials of the cemented carbide part and the substrate part are mixed because the substrate part also is fused at the same time during the stacking and forming of the cemented carbide part.

REFERENCE SIGNS LIST

1 Cemented carbide part
2 Substrate part
3 Intermediate layer
4 Coating layer
10 Cemented carbide composite material
20 Cemented carbide tool
21 Machining part
22 Base
S1 Preheat step
S2 Composite material producing step
S3 Heat treatment step
S10 Method for producing cemented carbide composite material

The invention claimed is:

1. A method for producing a cemented carbide composite material including: a cemented carbide part including WC—Co-based cemented carbide; and a substrate part including Ni-based alloy or Co-based alloy, the method comprising:
   a preheat step of preheating the substrate part at a temperature of 350° C. or higher and 1300° C. or lower; and
   a composite material producing step of forming the cemented carbide part on the substrate part by additive manufacturing, and producing the cemented carbide composite material having an intermediate layer between the substrate part and the cemented carbide part, such that the intermediate layer includes a center part with an area of at least 200 µm×200 µm in which components of the substrate part and components of the cemented carbide part are mixed, and the center part has a Vickers hardness less than 700 HV,
   wherein Co (cobalt) content of the cemented carbide part is 40 mass % or more and 50 mass % or less,
   wherein the substrate part has a Vickers hardness which is lower than the Vickers hardness of the center part of the intermediate layer, and
   wherein a measurement of the intermediate layer by XRD shows an area of a main peak of $M_6C$ type carbide that is 2% or less of an overall constituent phase.

2. The method for manufacturing the cemented carbide composite material according to claim 1, wherein the preheat step preheats the substrate part at the temperature of 500° C. or higher and 1300° C. or lower.

3. The method for manufacturing the cemented carbide composite material according to claim 1, further comprising a heat treatment step after the composite material producing step, the heat treatment step heat treating the cemented carbide composite material at a temperature of 1000° C. or more and 1300° C. or lower.

4. The method for manufacturing the cemented carbide composite material according to claim 3, wherein the heat treatment step heat treats the cemented carbide composite material at a temperature of 1200° C. or more and 1300° C. or lower.

5. The method for manufacturing the cemented carbide composite material according to claim 1, wherein the preheat step preheats the substrate part at the temperature of 350° C. or higher and 600° C. or lower.

* * * * *